(12) United States Patent
Hattori et al.

(10) Patent No.: US 8,509,614 B2
(45) Date of Patent: Aug. 13, 2013

(54) SUBSCRIBER PREMISES-SIDE OPTICAL NETWORK UNIT

(75) Inventors: Nobuhiko Hattori, Tokyo (JP); Naoto Nakamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 159 days.

(21) Appl. No.: 13/253,777

(22) Filed: Oct. 5, 2011

(65) Prior Publication Data

US 2012/0087663 A1 Apr. 12, 2012

(30) Foreign Application Priority Data

Oct. 8, 2010 (JP) ................................. 2010-228832

(51) Int. Cl.
*H04B 10/08* (2011.01)
*H04B 17/00* (2006.01)

(52) U.S. Cl.
USPC .............................................. 398/25; 398/38

(58) Field of Classification Search
None
See application file for complete search history.

(56) References Cited

U.S. PATENT DOCUMENTS

| 5,511,201 A * | 4/1996 | Kamimaki et al. ............ 713/310 |
| 2009/0080891 A1 * | 3/2009 | Kazawa et al. .................. 398/79 |
| 2010/0067901 A1 * | 3/2010 | Mizutani et al. ................. 398/20 |
| 2010/0166429 A1 * | 7/2010 | Odaka et al. .................... 398/115 |
| 2010/0215362 A1 * | 8/2010 | Shimoosako et al. .......... 398/25 |

FOREIGN PATENT DOCUMENTS

JP 2009-159199 7/2009

* cited by examiner

*Primary Examiner* — Danny W Leung
*Assistant Examiner* — Jai Lee
(74) *Attorney, Agent, or Firm* — Woodcock Washburn, LLP (57) ABSTRACT

[Problem]
This invention aims at solving the problem of how a subscriber premises-side optical network unit can be switched to an evaluation mode without the use of a jig board.

[Means for Solving the Problem]
The invention refers to a subscriber premises-side optical network unit (ONU 10) which is connected to a center-side optical network unit (OLT 1*a*) via an optical transmission line (optical fiber 2, 4) and to an external device (switch 6) via an electric signal line (electric signal line 5); comprising a memory (memory switch 15*a*) the stored content of which can be directly or indirectly rewritten by the external device; a detection part (CPU 15) for detecting that the content of the memory has been rewritten; and a control part (CPU 15) for performing, when the detection part detects that the stored content of the memory has been rewritten, a control whereby the optical sending part which sends optical signals to the optical transmission line is put into a continuous light emission state.

6 Claims, 7 Drawing Sheets

SUBSCRIBER PREMISES-SIDE OPTICAL NETWORK UNIT

CROSS-REFERENCE TO RELATED APPLICATIONS

This application claims priority to Japanese Patent Application No. 2010-228832, filed on Oct. 8, 2010, the contents of which is incorporated by reference herein in its entirety.

TECHNICAL FIELD

The present invention relates to a subscriber premises-side optical network unit (ONU).

BACKGROUND ART

Patent Document 1 discloses a subscriber premises-side optical network unit wherein, for example, when a jig board which applies a predetermined voltage to the ground wire is connected, a semiconductor switch inside the ONU is changed to an "ON" state and the ONU switches to an evaluation mode.

PRIOR ART DOCUMENT

Patent Document

[Patent Document 1] JP Patent Appl. Publ. No. 2009-159199

SUMMARY OF INVENTION

Problem to be Solved by Invention

However, the art disclosed in Patent Document 1 needs the jig board for the switch to evaluation mode, so that it has the problems that it is cumbersome, e.g., because the jig board has to be carried during maintenance, and that additional production costs for the jig board are incurred.

Here, the present invention aims at providing a subscriber premises-side optical network unit that can be switched to an evaluation mode without the use of a jig board.

Means for Solving the Problem

In order to solve the above problem, this invention is a subscriber premises-side optical network unit which is connected to a center-side optical network unit via an optical transmission line and to an external device via an electric signal line; comprising a memory the stored content of which can be directly or indirectly rewritten by the external device; a detection part for detecting that the stored content of the memory has been rewritten; and a control part for performing, when the detection part detects that the stored content of the memory has been rewritten, a control whereby the optical sending part which sends optical signals to the optical transmission line is put into a continuous light emission state.

Due to this configuration, the ONU can be switched to evaluation mode without the use of a jig board.

Further, another invention is characterized in that in addition to the above features, the memory is realized so that its stored content can be directly or indirectly rewritten via an I2C signal line.

Due to this configuration, it becomes possible to directly or indirectly rewrite the stored content via an I2C signal line with which an MSA interface is equipped by default.

Further, another invention is characterized in that in addition to the above features, the memory is realized so that it is connected directly to the external device via an I2C signal line and the stored content of the memory can be directly rewritten by the external device.

Due to this configuration, it becomes possible to directly rewrite the stored content via an I2C signal line with which an MSA interface is equipped by default.

Further, another invention is characterized in that in addition to the above features, the memory is realized so that the stored content of the memory can be indirectly rewritten via a LAN signal line.

Due to this configuration, it becomes possible to use a LAN signal line which is connected to an external device to indirectly rewrite the stored content of the memory.

Further, another invention is characterized in that in addition to the above features, when an optical signal sent by the center-side optical network unit is detected in the normal operation state, the control part puts the switch to the continuous light emission state on hold, even if the detection part has detected that the stored content of the memory has been rewritten.

Due to this configuration, it is possible to switch to continuous light emission mode and prevent any influence from being exerted on the system, even if the stored content of the memory has been mistakenly rewritten in a state where the ONU is connected to the center.

Further, another invention is characterized in that in addition to the above features, when optical signals sent by the center-side optical network unit are detected in the continuous light emission state, the control part performs a control whereby the continuous light emission state is ended and the switch to the normal operation state is made.

Due to this configuration, continuous light can be sent to the optical transmission line and any influence can be prevented from being exerted on the system, even if during operation in continuous light emission state, the ONU has mistakenly been connected to the center.

Effect of Invention

The present invention makes it possible to provide a subscriber premises-side optical network unit that can be switched to evaluation mode without the use of a jig board.

EMBODIMENTS

Hereinafter, embodiments of the present invention will be described.

(A) Description of the Configuration of the First Embodiment

Figure 1:
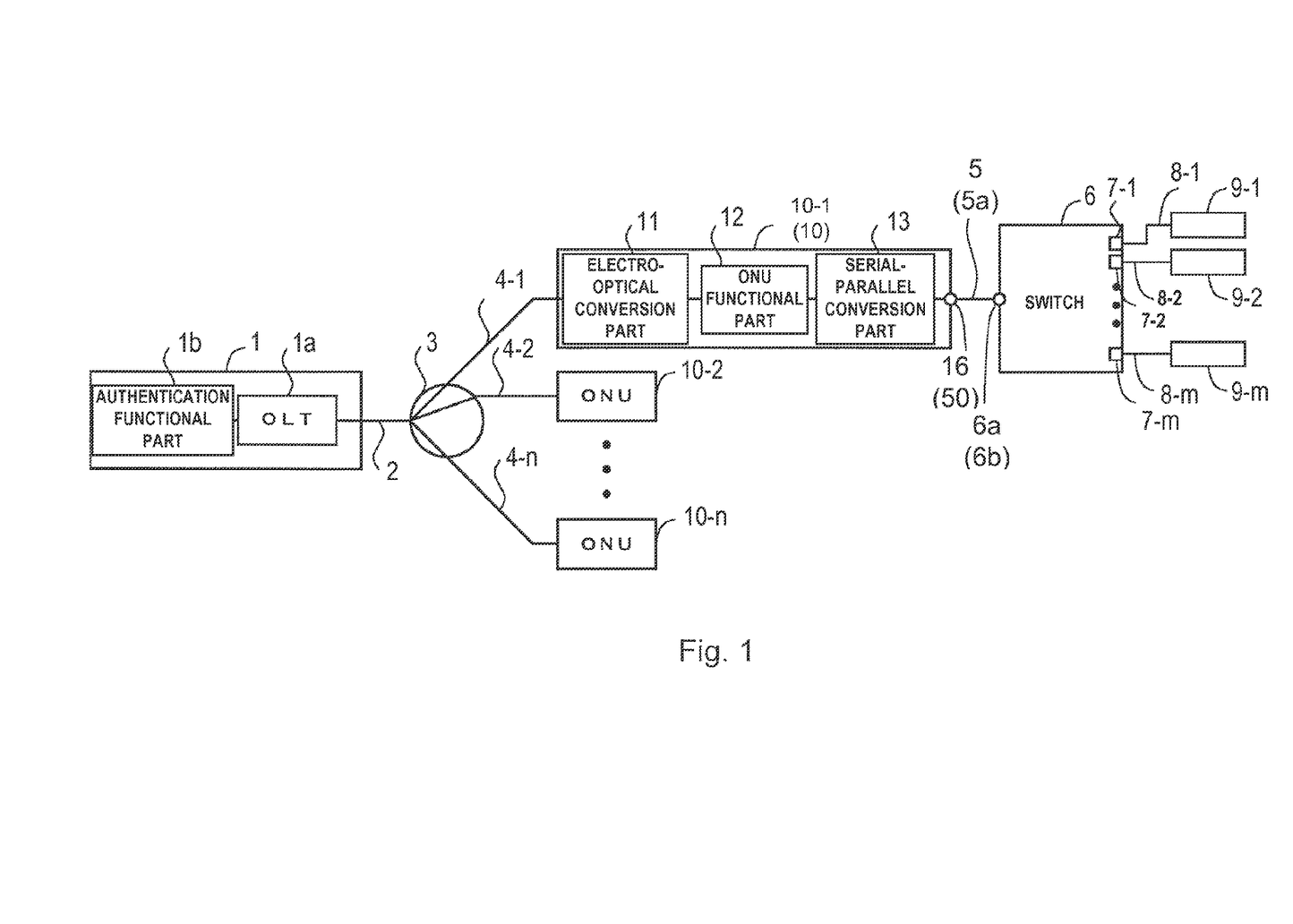
FIG. 1 shows a possible configuration of a PON-type optical transmission system according to an embodiment of the present invention.

FIG. 1 shows a possible configuration of a PON (Passive Optical Network)-type optical transmission system that comprises a subscriber premises-side optical network unit according to the first embodiment of the present invention. As shown in this figure, the main configuration elements of a PON-type optical transmission system are a center 1, an optical fiber 2 (corresponds to the "optical transmission line" in the claims), an optical splitter 3 (corresponds to the "optical transmission line" in the claims), optical fibers 4-1 to 4-n (correspond to the "optical transmission line" in the claims), ONUs 10-1 to 10-n (corresponds to the "subscriber premises-side optical network unit" in the claims), an electric signal line 5 (correspond to the "electric signal line" in the claims), a switch 6 (correspond to the "external device" in the claims), cables 8-1 to 8-m, and terminal devices 9-1 to 9-m.

Here, the center 1 comprises an OLT (Optical Line Terminal (optical network unit)) 1a (corresponds to the "center-side optical network unit" in the claims) and an authentication functional part 1b, and it multiplexes, e.g. using TDM (Time Division Multiplexing), the information that are supposed to be sent to the ONUs, and sends them. The OLT 1a performs the information exchange with the ONUs 10-1 to 10-n, and in case an ONU meets certain predetermined criteria, the OLT establishes a PON link. Incidentally, if the OLT 1a and the ONUs 10-1 to 10-n form a GE-PON (Gigabit Ethernet-PON), the establishment of the PON link is performed pursuant to the procedures of the IEEE802.3ah standard. After the PON link with an ONU has been established, the authentication functional part 1b accesses the respective ONU, obtains authentication data, and performs authentication regarding the legitimacy of the user.

The downward optical signal sent by the center 1 enters the optical splitter 3 via the optical fiber 2 and is split into n (n being a natural number) optical signals which enter the respective ONUs 10-1 to 10-n via optical fibers 4-1 to 4-n. Further, the upward optical signals sent by the ONUs 10-1 to 10-n enter the optical splitter 3 via the optical fibers 4-1 to 4-n, are combined to one optical signal and enter the center 1 via the optical fiber 2.

The ONUs 10-1 to 10-n are installed on the premises (in the home, on the ground) of the service subscriber, and external devices, such as a switch 6, are connected to it. The ONUs 10-1 to 10-n convert the optical signals sent by the center 1 via optical fibers 2, 4 into electric signals and supply these via an electric signal line 5 to the switch 6. Further, the ONUs 10-1 to 10-n convert the electric signals which were supplied from the switch 6 via the electric signal line 5 into optical signals and send them to the center 1. In the example of FIG. 1, the ONU 10-1 comprises an electro-optical conversion part 11, an ONU functional part 12 and a serial-parallel conversion part 13. In the ONU 10-1, the interface module 16 functioning as a connector is connected to the interface slot 6a of the switch 6 and sends and receives electric signals via the electric signal line 5.

The switch 6 is realized as a L2 switch, a L3 switch or a router, etc., and a plurality of ports 7-1 to 7-m (m being a natural number) are connected via cables 8-1 to 8-m to a plurality of terminal devices 9-1 to 9-m. The switch 6 switches the packets supplied by the ONU 10-1 depending on where they are send to, outputs them from the corresponding port, and supplies the packets outputted by the terminal devices 9-1 to 9-m to the ONU 10-1. The terminal devices 9-1 to 9-m are realized e.g. as personal computers or the like.

Figure 2:
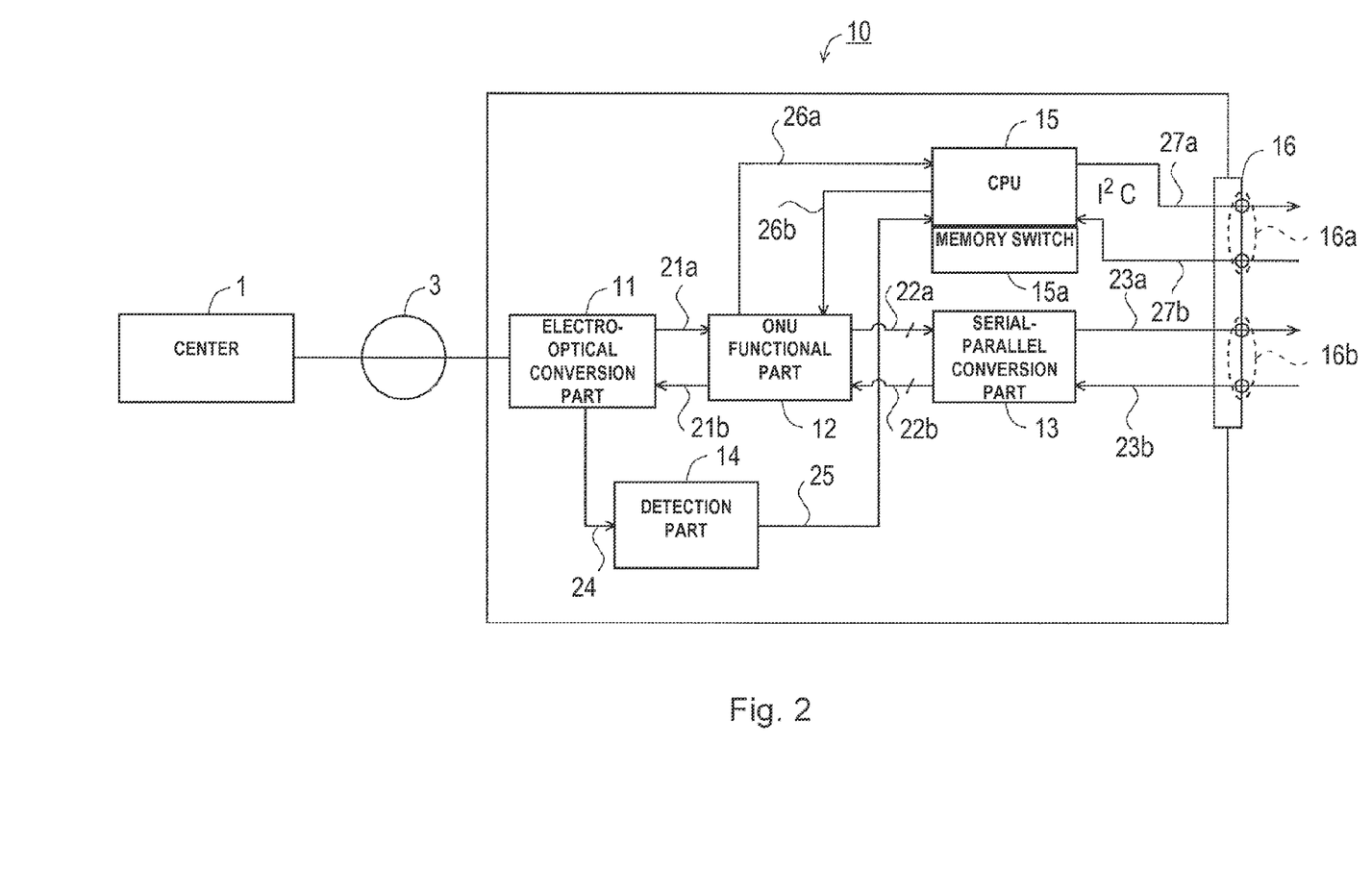
FIG. 2 shows a possible configuration of an ONU according to a first embodiment of the present invention.

FIG. 2 shows a possible configuration of the ONU 10-1 of FIG. 1 in detail.

Incidentally, the ONUs 10-2 to 10-n may be configured in the same way as the ONU 10-1 or they may be configured differently. In order to shorten the description, hereinafter the ONU 10-1 will be called ONU 10.

As shown in FIG. 2, the ONU 10 comprises an electro-optical conversion part 11 (corresponds to the "optical sending part" in the claims), an ONU functional part 12, a serial-parallel conversion part 13, a detection part 14, a CPU (Central Processing Unit) 15 (corresponds to the "detection part" and the "control part") in the claims), and a memory switch 15a.

Here, the electro-optical conversion part 11 converts the optical signals sent by the center 1 into electric signals (serial signals) and supplies them to the ONU functional part 12. At the same time, it also converts the electric signals supplied from the ONU functional part 12 back into optical signals and sends them to the center 1. The electro-optical conversion part 11 and the ONU functional part 12 are connected by a serial signal line 21a and a serial signal line 21b. The serial signals outputted by the electro-optical conversion part 11 are supplied to the ONU functional part 12 via the serial signal line 21a, and the serial signals outputted by the ONU functional part 12 are supplied to the electro-optical conversion part 11 via the serial signal line 21b.

The ONU functional part 12 converts the serial signals inputted from the electro-optical conversion part 11 via the serial signal line 21a into parallel signals, and after a termination processing supplies them via a parallel signal line 22a to the serial-parallel conversion part 13. Further, after the parallel signals supplied from the serial-parallel conversion part 13 via a parallel signal line 22b have been subjected to a termination processing, the ONU functional part 12 converts them into serial signals and supplies them via the serial signal line 21b to the electro-optical conversion part 11.

After the serial-parallel conversion part 13 has converted the parallel signals inputted from the ONU functional part 12 via the parallel signal line 22a into serial signals, it outputs them via a serial signal line 23a to the main signal terminal 16a of the interface module 16. Simultaneously, the serial-parallel conversion part 13 receives the serial signals inputted from the main signal terminal 16a of the interface module 16 via the serial signal line 23b and converts them into parallel signals, after which it supplies them via the parallel signal line 22b to the ONU functional part 12.

In case an optical signal from the center 1 has been received through the electro-optical conversion part 11, the detection part 14 detects this via a signal line 24 and informs the CPU 15 via the signal line 25.

The CPU 15 controls the ONU functional part 12 based on a program and data stored in a non-volatile memory not shown in the drawings. The CPU 15 is connected to the ONU functional part 12 through serial signal lines 26a, 26b over which serial signals (e.g., signals conforming to RS-232C) are transmitted, so that the CPU 15 can send and receive data to and from the ONU functional part 12. Further, the CPU 15 is connected to the main signal terminal 16a of the interface module 16 through signal lines 27a, 27b over which serial signals (e.g., I2C (Inter-Integrated Circuit) ((2-Wire Serial interface) or (2-Wire Serial Bus))) are transmitted. Moreover, the CPU 15 is informed via the signal line 25 when the detection part 14 has received an optical signal.

The memory switch 15a is, e.g., a logical switch configured as a memory with at least 1 bit, and by this memory switch 15a being rewritten, the operation mode of the ONU 10 is changed. In the example of FIG. 2, the memory switch 15a has a configuration independent of the CPU 15. However, they may also be configured as one piece (the memory switch 15a is comprised in the CPU 15).

The interface module 16 sends and receives data to and from the switch 6 through serial signals, and it is supplied with electricity by the switch 6 via a power line not shown in the drawings. In the ONU 10 of this embodiment, the interface module 16 conforms to MSA (Multi-Source Agreement) interface standards and has a configuration that enables it to be connected by being directly inserted into the MSA interface slot 6a arranged on the switch 6. Standards for MSA interfaces include GBIC, SFP, etc., each of which may be used. In order to shorten the description, FIG. 2 only shows the terminals of the MSA interface.

(B) Description of the Operation of the First Embodiment

Figure 3:
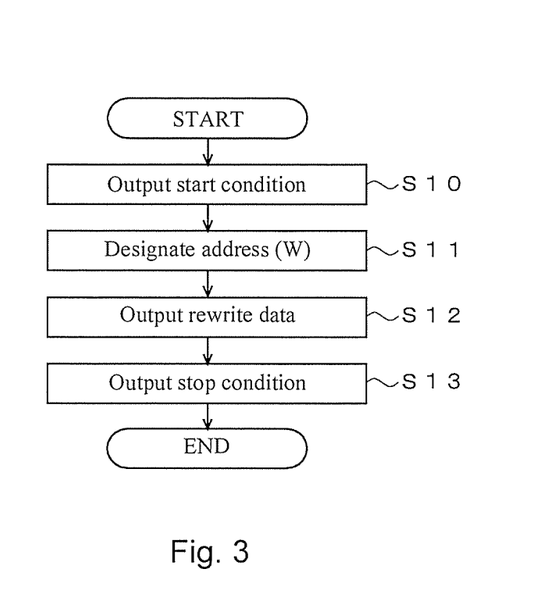
FIG. 3 is a flowchart describing the flow of the operations performed in the switch of the first embodiment.
Figure 4:
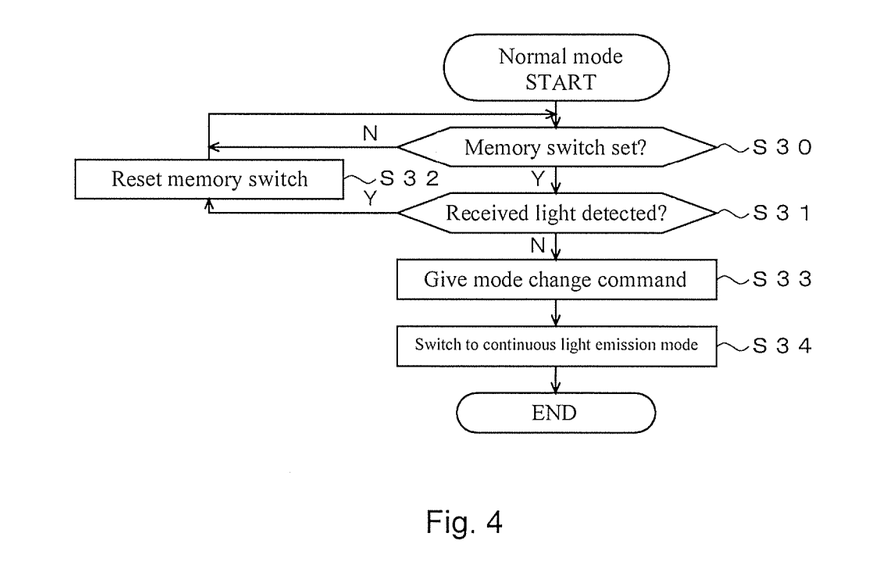
FIG. 4 is a flowchart describing the flow of the operations performed in the ONU of the first embodiment in normal mode.
Figure 5:
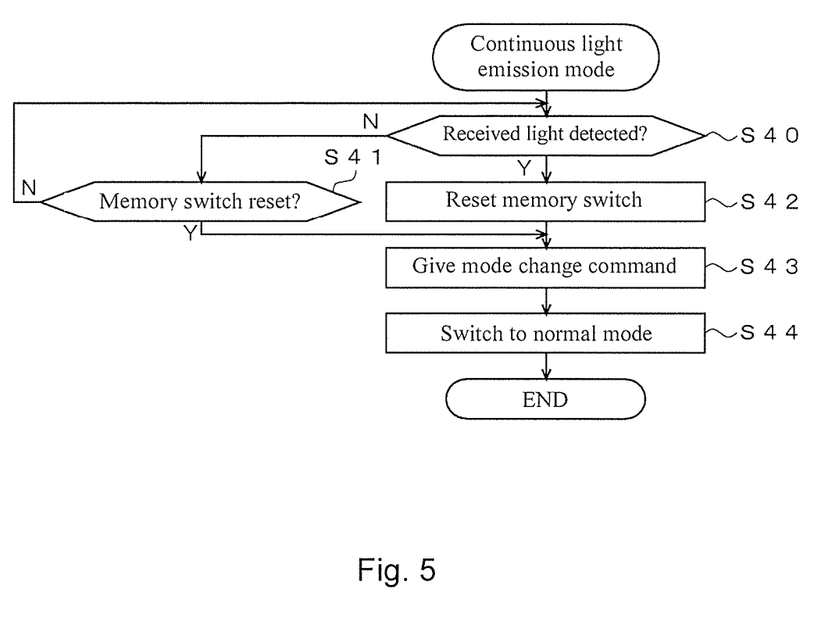
FIG. 5 is a flowchart describing the flow of the operations performed in the ONU of the first embodiment in continuous light emission mode.

Next, the operation of the first embodiment will be described. FIGS. 3 to 5 are flowcharts describing a possible example of operations performed in the first embodiment. First, the general idea of these operations will be explained. If, e.g. during maintenance, it is judged whether the ONU 10 operates correctly, the optical fiber 4-1 is disconnected from the ONU 10, any one of the terminal devices is activated, and the switch 6 is instructed to set the memory switch 15a of the ONU 10. The switch 6 accesses the ONU 10 and sets the memory switch 15a. When the memory switch 15a is set, the CPU 15 supplies the ONU functional part 12 with a command so that its operation mode switches from normal mode to continuous light emission mode. Since, as a result thereof, the electro-optical conversion part 11 switches to continuous light emission mode, wherein it continuously outputs sending light, it can be judged by measuring the intensity of the outputted optical signals whether the ONU 10 operates properly. Now, in case the memory switch 15a is reset, the ONU 10 is switched again to normal mode. Further, in order to prevent that in case an optical signal from the center 1 is received in a state where the memory switch 15a has been set, the system is influenced by the continuous light, the ONU 10 is forced to switch to normal mode if the detection part 14 detects an optical signal from the center 1.

FIG. 3 shows one example of the operation carried out by the switch 6 when setting (or resetting) the memory switch 15a. This operation is realized, e.g., when an instruction has been given by a terminal device. When the operation of this flowchart is started, the following steps are performed.

Step S10: The switch 6 outputs that it is in a start condition for starting communication via the serial signal lines 27a, 27b to the CPU 15. In detail, the switch 6 operates as master for the I2C communication, and the CPU 15 operates as slave. In I2C communication, the setting when the communication starts is such that the start condition is met when the SCL (Serial Clock), which is a clock signal, is "high" and the master sets the SDA (Serial Data), which is a data signal, to "low".

Step S11: The switch 6 designates the CPU 15 as its communication partner and sends data showing that data will be send from master to slave, to the CPU 15. More precisely, in I2C communication, an address of 7 or 10 bits is used to designate the slave and a 1-bit information (RW) is used to show that the master will send or that it will receive. Here, the switch 6 sends the address assigned to the CPU 15 and also information showing that the master is sending, to the serial signal lines 27a, 27b. Then, in case the CPU 15 has correctly received the data, it sends an ACK (Acknowledge) signal, so that the switch 6 recognizes that communication is carried out correctly.

Step S12: The switch 6 sends data instructing that the memory switch 15a is to be set (or data showing that it is to be reset), to the CPU 15. More precisely, the switch 6 sends, e.g., 8 bit data requesting that the memory switch 15a be set (or reset), to the CPU 15. Then, in case the CPU 15 has correctly received the data, it sends an ACK signal as in the above-mentioned case. When the CPU 15 receives the data, it sets (or resets) the memory switch 15a. This means that the switch 6 can indirectly rewrite the content of the memory switch 15a via the CPU 15.

Step S13: The switch 6 outputs a stop condition for ending communication via the serial signal lines 27a, 27b to the CPU 15. More precisely, in I2C communication, the setting for when the communication is stopped is such that the stop condition is met when the master sets the SCL to "low" and stops the clock, after which it sets the SCL to "high" and the SDA to "high".

In the above operation, the switch 6 can access the CPU 15 via the serial signal lines 27a, 27b and set or reset the memory switch 15a.

Next, the operations carried out by the ONU 10 will be described with the help of FIGS. 4 and 5. First, FIG. 4 is a flowchart describing the flow of the operation carried out in normal mode. When the operation of this flowchart is carried out, the following steps are performed.

Step S30: The CPU 15 judges whether the memory switch 15a has been set (whether its state has changed from reset to set). In case it has been set (Step S30: YES), the operation proceeds to Step S31, in any other case (Step S30: NO), the same operation is repeated (waiting state). The normal mode is an operation mode wherein communication with the center 1 through optical signals is carried out, and the continuous light emission mode is an operation mode wherein in order to judge whether the ONU 10 works correctly, the electro-optical conversion part 11 is brought to a state where it continuously emits light. In case that, e.g. in normal mode, the memory switch 15a is set through the operation shown in FIG. 3, it is judged "YES" and the operation proceeds to Step S31.

Step S31: Taking into account the detection signal from the detection part 14, the CPU 15 judges whether received light has been detected. In case received light has been detected (Step S31: YES), the operation proceeds to Step S32, while in case no received light has been detected (Step S31: NO), the operation proceeds to Step S33.

Step 32: The CPU 15 resets the memory switch 15a, returns to Step S30 and repeats the same operation as described above. In case that, e.g. in a state where the optical fiber 4-1 is connected to the ONU 10, the memory switch 15a is mistakenly set, the ONU 10 enters the continuous light emission state so that the other ONUs cannot communicate. In other words, communication is carried out in upward direction from the ONUs 10-1 to 10-n toward the center 1 through, e.g., TDMA (Time Division Multi Access), so that each ONU can only communicate within the time period assigned to it. Therefore, when the ONU 10 enters into continuous light emission mode in a state where it is connected to the center 1, the whole system becomes incapable of communicating. Therefore, the switch to continuous light emission mode is put on hold by the operations in Step S31 and Step S32.

Step S33: The CPU 15 sends a mode change command for switching from normal mode to continuous light emission mode to the ONU functional part 12 via the serial signal line 26b.

Step S34: Based on the mode change command sent by the CPU 15, the ONU functional part 12 switches a laser diode (not shown in the drawings) of the electro-optical conversion part 11 to continuous light emission mode where it continuously emits light.

In case that in the above operation the memory switch 15a has been set by the operation shown in FIG. 3, a switch is made from normal mode to continuous light emission mode and the laser diode of the electro-optical conversion part 11 continuously emits light. Because of this, it is possible to measure the intensity and spectrum of the continuous light with a measuring device. Further, if the memory switch 15a has been mistakenly set in a state where the ONU 10 is connected to the center 1, the switch to continuous light emission mode is put on hold and the memory switch 15a is reset. Thereby, any influence from the continuous light sending can be prevented from affecting the system.

Next, FIG. 5 is a flowchart describing the flow of the operation carried out in continuous light emission mode. When the operation of this flowchart is carried out, the following steps are performed.

Step S40: Taking into account the detection signal from the detection part 14, the CPU 15 judges whether received light from the center 1 has been detected. In case received light has been detected (Step S40: YES), the operation proceeds to Step S42, while in case no received light has been detected (Step S40: NO), the operation proceeds to Step S41.

Step S41: The CPU 15 judges whether the memory switch 15a has been reset (whether its state has changed from set to reset). In case it is judged that it has been reset (Step S41: YES), the operation goes on to Step S43, while in case it is judged that it has not been reset (Step S41: NO), the operation returns to Step S40 and the same operation as above is repeated. In case that, e.g. in continuous light emission mode, the memory switch 15a is accessed by the switch 6 and reset through the operation shown in FIG. 3, it is judged "YES" and the operation proceeds to Step S43.

Step S42: The CPU 15 resets the memory switch 15a.

Step S43: The CPU 15 issues a mode change command for switching from continuous light emission mode to normal mode, via the serial signal line 26b to the ONU functional part 12.

Step S44: Based on the mode change command sent by the CPU 15, the ONU functional part 12 stops the continuous light emission mode of the laser diode of the electro-optical conversion part 11 and switches to normal mode, in which it can communicate with the center 1.

In case that in the above operation the memory switch 15a has been reset by the operation shown in FIG. 3, a switch is made from continuous light emission mode to normal mode, the continuous light emission of the laser diode of the electro-optical conversion part 11 is stopped, and the operation mode is changed to the normal mode in which communication with the center 1 is possible. Further, when a connection has been mistakenly made to the center 1 in continuous light emission mode, the continuously emitted light is stopped and the memory switch 15a is reset. Thereby, any influence from the continuous light sending can be prevented from affecting the system.

As described above, in the first embodiment of this invention, the memory switch 15a is reset by the switch 6, so that the ONU 10 is switched to continuous light emission mode, which is an evaluation mode. Therefore, the ONU 10 can be switched to continuous light emission mode without the use of a special jig board. Further, because the already existing serial signal lines 27a, 27b are used when doing the above, it ceases to be necessary to additionally arrange new terminals or the like. Further, since the switch to continuous light emission mode is put on hold if the memory switch 15a has been mistakenly set in a state where the ONU 10 is connected to the center 1, any influence from the continuous light sending can be prevented from affecting the system. Further, since the continuously emitted light is stopped when a connection has been mistakenly made to the center 1 in continuous light emission mode, any influence from the continuous light sending can be prevented from affecting the system in this case as well.

(C) Description of the Configuration of the Second Embodiment

Figure 6:
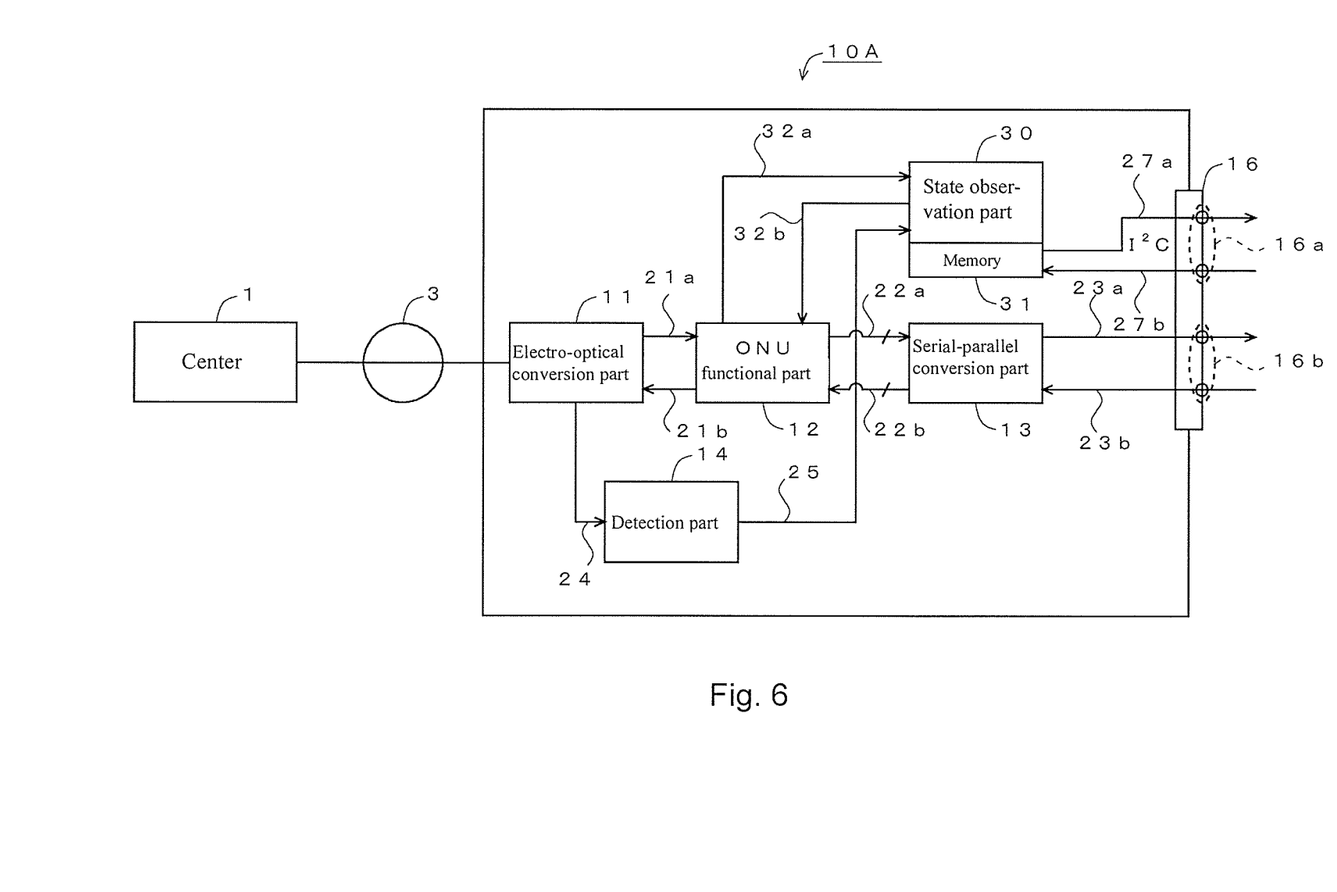
FIG. 6 shows a possible configuration of an ONU according to a second embodiment of the present invention.

Next, a second embodiment will be described with the help of FIG. 6. Those parts of FIG. 6 that correspond to FIG. 2 will be given the same numerals as in FIG. 2 and their explanation will be omitted. When comparing the ONU 10A according to the second embodiment, which is shown in FIG. 6, to FIG. 2, it becomes clear that the CPU 15 has been exchanged with a state observation part 30 (corresponds to the "detection part" and the "control part" stated in the claims), that the memory switch 15a has been replaced with a memory 31 (corresponds to the "memory" stated in the claims), and that the serial signal lines 27a, 27b are connected to the memory 31. Incidentally, the rest of the configuration is the same as in FIG. 2.

Herein, the state observation part 30 observes the state of a bit that is stored under a predetermined address in the memory 31, and in case the state of the bit in the memory 31 changes, it sends a mode change command for switching the operation mode to the ONU functional part 12 and changes the operation mode.

The memory 31 is configured as a memory that is capable of I2C communication. Concretely, the memory 31 is, e.g., a dual port memory in which information can be rewritten by both the switch 6 and the state observation part 30.

(D) Description of the Operation of the Second Embodiment

The second embodiment differs from the first embodiment shown in FIG. 2 only in that the switch 6 directly accesses the memory 31 and changes the bit at a predetermined address set up in the memory 31. In all other aspects, the first and second embodiments are identical. That means that in the switch 6, the operation shown in FIG. 3 is carried out, and that a predetermined address in the memory 31 is set or reset via the serial signal lines 27a, 27b which conform to the I2C standard. Further, the operations of FIGS. 4 and 5 are carried out and the operation mode is switched between normal mode and continuous light emission mode.

Just as in the first embodiment, in the second embodiment, the ONU 10 can be switched to continuous light emission mode without the use of a special jig board. Further, in a case where the optical fiber 4-1 is mistakenly connected in continuous light emission mode, the ONU 10 is forced to switch to normal mode, and in a case where the memory 31 is set when connected to the center 1, the switch to continuous light emission mode is put on hold. Thus, any influence from the continuous light sending can be prevented from affecting the system as a whole. Further, since the memory 31 is directly rewritable, the load of the CPU 15 can be lightened.

(E) Description of the Configuration of the Third Embodiment

Figure 7:
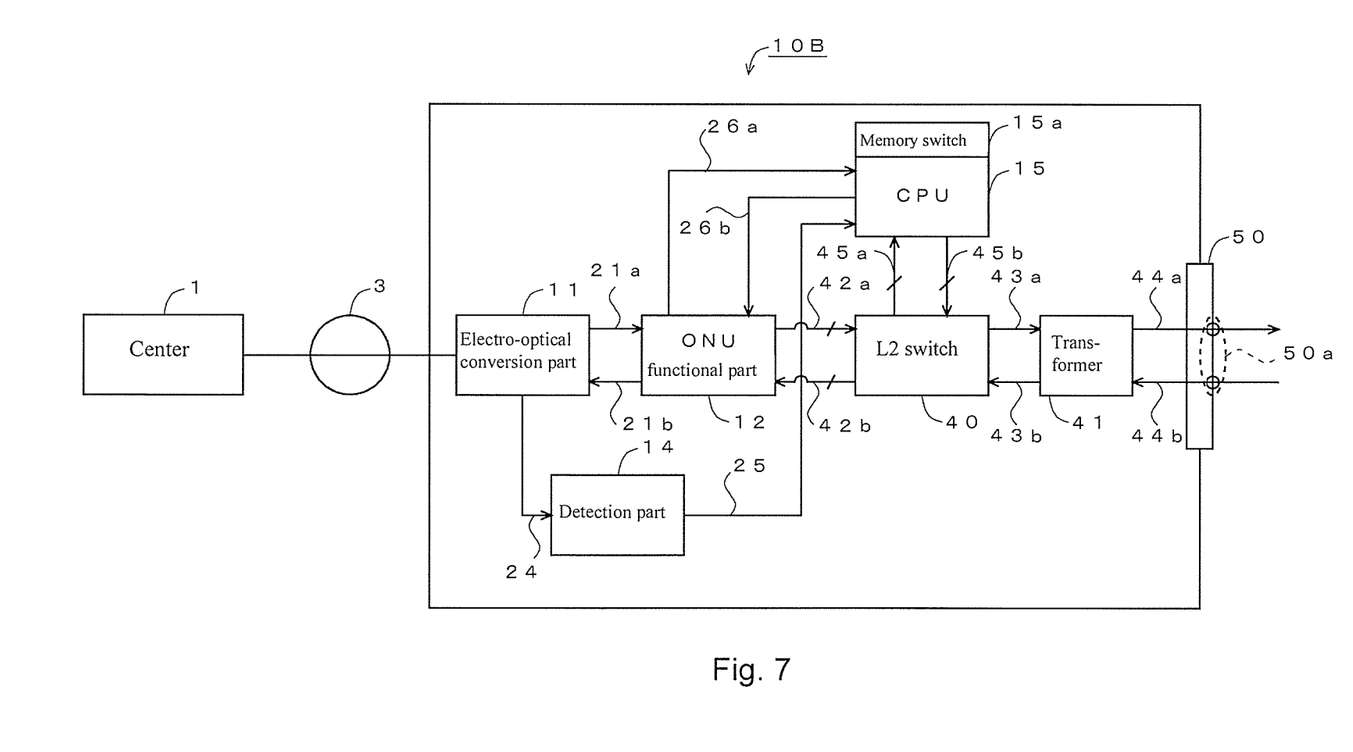
FIG. 7 shows a possible configuration of an ONU according to a third embodiment of the present invention.

Next, the operation of the third embodiment will be described. FIG. 7 is a block diagram showing a possible configuration of the third embodiment. Those parts of FIG. 7 that correspond to the first embodiment shown in FIG. 2 will be given the same numerals as in FIG. 2 and their explanation will be omitted. When comparing the ONU 10B according to the third embodiment, which is shown in FIG. 7, to FIG. 2, it becomes clear that the serial-parallel conversion part 13 has been removed, and that an L2 switch 40 and a transformer 41 have been added.

Further, the interface module 16, which conforms to a MSA interface standard, has been exchanged with an interface module 50 which conforms to the Ethernet (registered trademark) standard. Moreover, a main signal terminal 50a of the interface module 50 and the transformer 41 are connected through signal lines 44a, 44b for transmitting Ethernet signals, and the transformer 41 and the L2 switch 40 are in the same way connected through signal lines 43a, 43b for transmitting Ethernet signals. The L2 switch 40 and the ONU functional part 12 as well as the L2 switch 40 and the CPU 15 are connected through signal lines 42a, 42b, 45a, 45b which conform, e.g., to MII (Media Independent Interface) or GMII (Gigabit MII) standards.

Incidentally, as to the ONU 10 and the switch 6 of FIG. 1, in the third embodiment, the interface module 50 which conforms to the Ethernet standard and belongs to the ONU 10, and the interface module 6b of the switch 6 are connected through a LAN cable.

Here, the transformer 41 is a DC cut transformer for removing the direct current portion of the signal. The L2 switch 40 possesses a function of judging the relaying address of a packet based on the address included in the destination information of the packet, and relaying it. Concretely, for a packet sent by the switch 6, it selects the relaying address from the group of the CPU 15 and the ONU functional part 12 based on the address of the packet.

(F) Description of the Operation of the Third Embodiment

Figure 8:
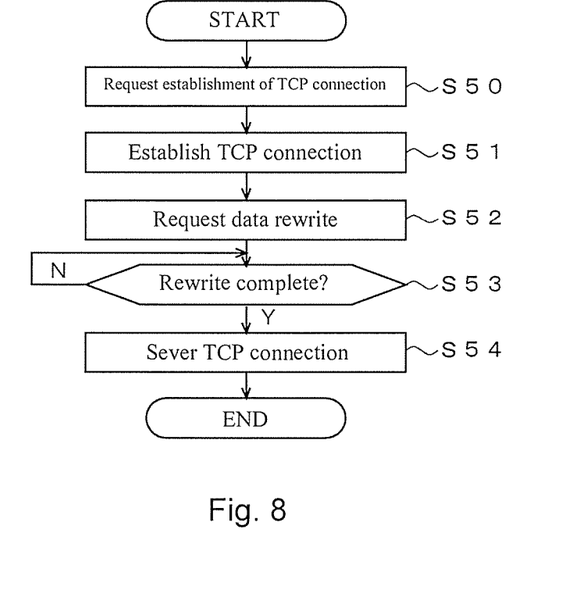
FIG. 8 is a flowchart describing the flow of the operations performed in the switch of the third embodiment.

FIG. 8 is a flowchart describing the flow of the operations performed by the switch 6 in the third embodiment, which is shown in FIG. 7, when setting or resetting the memory switch 15a. When the operation of this flowchart is started, the following steps are performed.

Step S50: The switch 6 requests the establishment of a TCP (Transmission Control Protocol) connection from the CPU 15 of the ONU 10. In other words, the switch 6 sends information (a packet) for which the sending address is the IP (Internet Protocol) address assigned to the CPU 15. The L2 switch 40 of the ONU 10 takes the IP address comprised in the packet into consideration and relays the received packet to the CPU 15. As a result, the CPU 15 receives the connection establishment request from the switch 6.

Step S51: The CPU 15 responds to the connection establishment request of Step S50, and subsequently, the switch 6 carries out an acknowledgment to the CPU 15. Thereby, a TCP connection is established between the switch 6 and the CPU 15.

Step S52: The switch 6 sends information requesting that the memory switch 15a be rewritten, to the CPU 15. Concretely, the switch 6 sends information instructing that the memory switch 15a is to be set (or information showing that it is to be reset), to the CPU 15. As a result, the CPU 15 sets (or resets) the memory switch 15a.

Step S53: The switch 6 inquires of the CPU 15 whether the rewriting of the memory switch 15a is complete. In case it is complete, the operation proceeds to Step S54, in all other cases, the same operation in repeated.

Step S54: The switch 6 requests the CPU 15 to sever the TCP connection.

Concretely, the switch 6 informs the CPU 15 of the completion of the sending, and subsequently, the CPU 15 informs the switch 6 that it has acknowledged the completion of the sending. Then, the switch 6 accepts the acknowledgement of the completion of the sending by the CPU 15, and the TCP connection is severed.

The operations performed by the ONU 10 are the same as shown in FIGS. 4 and 5. Herein, the operation mode is changed depending on the state of the memory switch 15a and the reception state of the received light.

As described above, in the third embodiment of this invention, the operation mode can be changed via Ethernet, so that it is possible to switch the ONU 10 to evaluation mode without the use of a jig board. Further, in a case where the optical fiber 4-1 is mistakenly connected in continuous light emission mode, the system is forced to switch to normal mode, and in a case where a predetermined address of the memory 31 is set when the ONU 10 is connected to the center 1, the switch to continuous light emission mode is put on hold. Thus, any influence from the continuous light sending can be prevented from affecting the system as a whole.

(G) Differently Formed Embodiments

The above embodiments were single examples, and various types of differently formed embodiments exist beside them. For example, in the first and third embodiment, the memory switch 15a has a configuration independent of the CPU 15. However, the memory switch 15a may also be comprised in the CPU 15.

Further, in the above embodiments, the operation of FIG. 3 or the operation of FIG. 8 was carried out by the switch 6 when a request was issued by a terminal device. However, the operation of FIG. 3 or the operation of FIG. 8 may also be carried out in a case where, e.g., the switch 6 is subjected to a predetermined action in a state where the ONU 10 is connected to the switch 6.

Alternatively, it is also possible to realize the invention such that the switch 6 automatically carries out the operation of FIG. 3 or the operation of FIG. 8 at the time when the ONU 10 is connected to the switch 6, and that a switch is made to continuous light emission mode for a certain amount of time (e.g., 1 minute), after which a switch is made to the normal mode. Incidentally, it would be assumed here that the ONU 10 is connected to the center 1 in a state where it has been switched to continuous light emission mode. But since in such a case, the operation of FIG. 5 would force a switch to normal mode, any influence can be prevented from affecting the system as a whole.

Further, in the second embodiment, the memory 31 is a dual port memory, so that both the switch 6 and the state observation part 30 can access the memory 31. However, they would also both be able to access the memory 31 if a method with, e.g., a multi master system wherein both the switch 6 and the state observation part 30 can operate as master was used.

EXPLANATION OF REFERENCE NUMERALS

1 Center
1a OLT (center-side optical network unit)

1b Authentication functional part
2, 4 Optical fiber (optical transmission line)
3 Optical splitter (optical transmission line)
5 Electric signal line
5a LAN cable
6 Switch (external device)
9 Terminal device
10, 10A, 10B ONU (subscriber premises-side optical network unit)
11 Electro-optical conversion part
12 ONU functional part
13 Serial-parallel conversion part (optical sending part)
14 Detection part
15 CPU (detection part, control part)
15a Memory switch (memory)
16 Interface module
30 State observation part (detection part, control part)
31 Memory (memory)
40 L2 switch
41 Transformer
50 Interface module

What is claimed:

1. Subscriber premises-side optical network unit which is connected to a center-side optical network unit via an optical transmission line and to an external device via an electric signal line;
comprising:
a memory, the stored content of which can be directly or indirectly rewritten by the external device;
a detection part for detecting that the stored content of the memory has been rewritten;
and
a control part for performing, when the detection part detects that the stored content of the memory has been rewritten, a control whereby an optical sending part which sends optical signals to the optical transmission line is put into a continuous light emission state.

2. The subscriber premises-side optical network unit according to claim 1, wherein:
the memory is realized so that its stored content can be directly or indirectly rewritten via an I2C (Inter-Integrated Circuit) signal line.

3. The subscriber premises-side optical network unit according to claim 2, wherein:
the memory is realized so that it is connected directly to the external device via an I2C signal line and the stored content of the memory can be directly rewritten by the external device.

4. The subscriber premises-side optical network unit according to claim 1, wherein:
the memory is realized so that its stored content can be indirectly rewritten via a LAN signal line.

5. The subscriber premises-side optical network unit according to claim 1, wherein:
when an optical signal sent by the center-side optical network unit is detected in the normal operation state, the control part puts the switch to the continuous light emission state on hold, even if the detection part has detected that the stored content of the memory has been rewritten.

6. The subscriber premises-side optical network unit according to claim 1, wherein:
when optical signals sent by the center-side optical network unit are detected in the continuous light emission state, the control part performs a control whereby the continuous light emission state is ended and the switch to the normal operation state is made.

* * * * *